(12) United States Patent
Kuo et al.

(10) Patent No.: US 12,522,917 B2
(45) Date of Patent: Jan. 13, 2026

(54) METHOD FOR PREPARING BORON NITRIDE THIN FILM AND BORON NITRIDE THIN FILM

(71) Applicant: PENTAPRO MATERIALS INC., Hsinchu County (TW)

(72) Inventors: Wen-Che Kuo, Hsinchu County (TW); Wen-Lian Lee, Hsinchu County (TW); Hao-Chun Lee, Hsinchu County (TW); Yuan-Liang Kuo, Hsinchu County (TW); Chien-Ho Liu, Hsinchu County (TW); Ming-Sin Tsai, Hsinchu County (TW)

(73) Assignee: PENTAPRO MATERIALS INC., Hsinchu County (TW)

( * ) Notice: Subject to any disclaimer, the term of this patent is extended or adjusted under 35 U.S.C. 154(b) by 0 days.

(21) Appl. No.: 18/764,874

(22) Filed: Jul. 5, 2024

(65) Prior Publication Data
US 2025/0011923 A1    Jan. 9, 2025

Related U.S. Application Data

(60) Provisional application No. 63/525,367, filed on Jul. 7, 2023.

(51) Int. Cl.
*C23C 16/34* (2006.01)
*C23C 16/50* (2006.01)

(52) U.S. Cl.
CPC ............ *C23C 16/342* (2013.01); *C23C 16/50* (2013.01)

(58) Field of Classification Search
None
See application file for complete search history.

(56) References Cited

U.S. PATENT DOCUMENTS

2022/0384189 A1 * 12/2022 Zhu ............... C23C 16/342

FOREIGN PATENT DOCUMENTS

| JP | A-S61-266576 A | 5/1985 |
| JP | S63134662 A | 6/1988 |
| JP | H02175873 A | 7/1990 |
| JP | P-2025-10513 A | 1/2025 |
| WO | WO2015200496 | * 12/2015 |

* cited by examiner

*Primary Examiner* — Nathan T Leong
(74) *Attorney, Agent, or Firm* — LANWAY IPR SERVICES; Chun-Ming Shih

(57) ABSTRACT

The present invention provides a method for preparing a boron nitride thin film and the boron nitride thin film itself. The method primarily includes providing a precursor containing boron and nitrogen atoms to an energy control apparatus and forming an excited state of the precursor within this energy control apparatus. Finally, a material layer is formed on a substrate, where this material layer comprises boron nitride. The key feature of this method is the use of an energy control apparatus that includes a first electromagnetic wave source emitting electromagnetic waves within a specific wavelength range. The advantage of this method is that it can be operated at lower temperatures, reducing the risk of thermal damage to the substrate and also decreasing energy consumption. Additionally, the method includes several optional steps that can further enhance the formation of the boron nitride thin film.

19 Claims, 5 Drawing Sheets

METHOD FOR PREPARING BORON NITRIDE THIN FILM AND BORON NITRIDE THIN FILM

FIELD OF THE DISCLOSURE

The present invention provides a method for depositing a thin film and the thin film itself, more particularly to a method for preparing a boron nitride thin film and the boron nitride thin film itself. This invention belongs to the field of thin films, especially concerning methods for preparing boron nitride thin films.

BACKGROUND OF THE INVENTION

Boron nitride thin films have attracted extensive attention due to their unique mechanical, thermal, chemical, and electrical properties. These properties make boron nitride thin films particularly suitable for various high-temperature and high-pressure applications, such as cutting tools, electronic devices, and protective coatings. The synthesis of boron nitride thin films typically involves chemical vapor deposition (CVD) or physical vapor deposition (PVD) techniques using precursors like borourea and aminoborane.

However, the synthesis of high-quality BN thin films still faces challenges due to difficulties in controlling the stoichiometry, phase, and microstructure of the films. For example, traditional chemical vapor deposition techniques require high temperatures, which can lead to thermal damage to the substrate and increased energy consumption. Moreover, while physical vapor deposition techniques can be conducted at lower temperatures, they have limited control over the stoichiometry and phase of the thin films.

Despite the many excellent properties of boron nitride thin films, the challenges in their preparation process still limit their practical application. Addressing these issues remains a significant concern for those skilled in the art.

SUMMARY OF THE INVENTION

The present invention addresses the aforementioned problems by providing a method for preparing a boron nitride thin film and the boron nitride thin film itself.

In accordance with the objectives and others, the present invention provides a method for preparing a boron nitride thin film, comprising the following steps. First, a precursor containing boron and nitrogen atoms is provided to an energy control apparatus. Then, an excited state of the precursor is formed within the energy control apparatus. This excited state includes boron and nitrogen atoms, or some or all of the ligands are in a bond-breaking state. Subsequently, a material layer is formed on a substrate, wherein the material layer comprises boron nitride. During this process, the energy control apparatus includes a first electromagnetic wave source that emits electromagnetic waves within a specific wavelength range.

In certain embodiments, the precursor is selected from compounds where the molecular percentage of boron to nitrogen is 1:1. Furthermore, the precursor is selected from compounds including borazine (B3H6N3), tris(dimethylamino)borane (TDMAB, C3H12BN), tetramethylammonium borane, borourea, aminoborane (BH6N), and tris(ethylmethylamino)borane (TEMAB), each having a molecular percentage of boron to nitrogen of 1:1.

In some embodiments, the method further comprises forming a substrate bias on the substrate to reduce particle deposition on the substrate surface.

DESCRIPTION OF THE PREFERRED EMBODIMENTS

Figure 1:
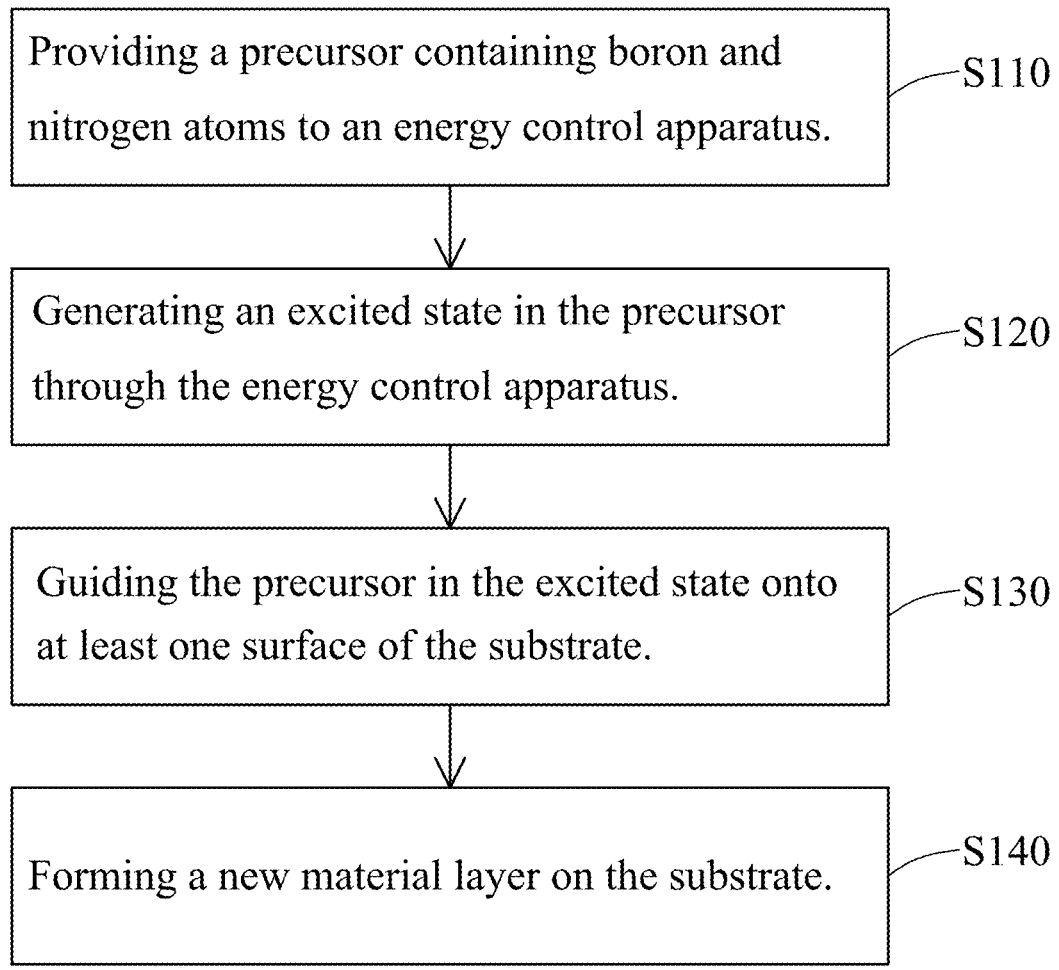
FIG. 1 is a flow chart illustrating an embodiment of the method for preparing a boron nitride layer on a substrate according to the present invention.

Referring to the process depicted in FIG. 1, the present invention provides a method for depositing a boron nitride layer on a substrate. The method begins by providing a precursor containing boron and nitrogen atoms to an energy control apparatus, as shown in step S110. The precursor is selected from compounds where the molecular percentage of boron to nitrogen is 1:1. These compounds include borazine (Boron-Nitrogen Cycloalkanes, B3H6N3), trimethylamine borane (C3H12BN), tetramethylammonium borohydride, boron nitride, ammonia borane (BH6N), and triethylmethylamine borane (TEMAB).

Borazine is a colorless liquid at room temperature and is often used as a precursor for depositing boron nitride thin films due to its high thermal stability. Tris(dimethylamino)borane is known for its high reactivity and volatility, making it suitable for chemical vapor deposition processes. Tetramethylammonium borohydride is a compound that is stable in air and can be used as a single-source precursor for boron nitride films. Borourea is a compound that is stable under normal conditions and can be used as a precursor for synthesizing boron nitride nanotubes. Aminoborane is a solid at room temperature and can be used as a precursor for synthesizing boron nitride nanotubes and nanosheets. Tris(ethylmethylamino)borane is a compound that is stable under normal conditions and can be used as a precursor for synthesizing boron nitride films. In the present invention, these compounds can be used individually or in combination.

Figure 2A:
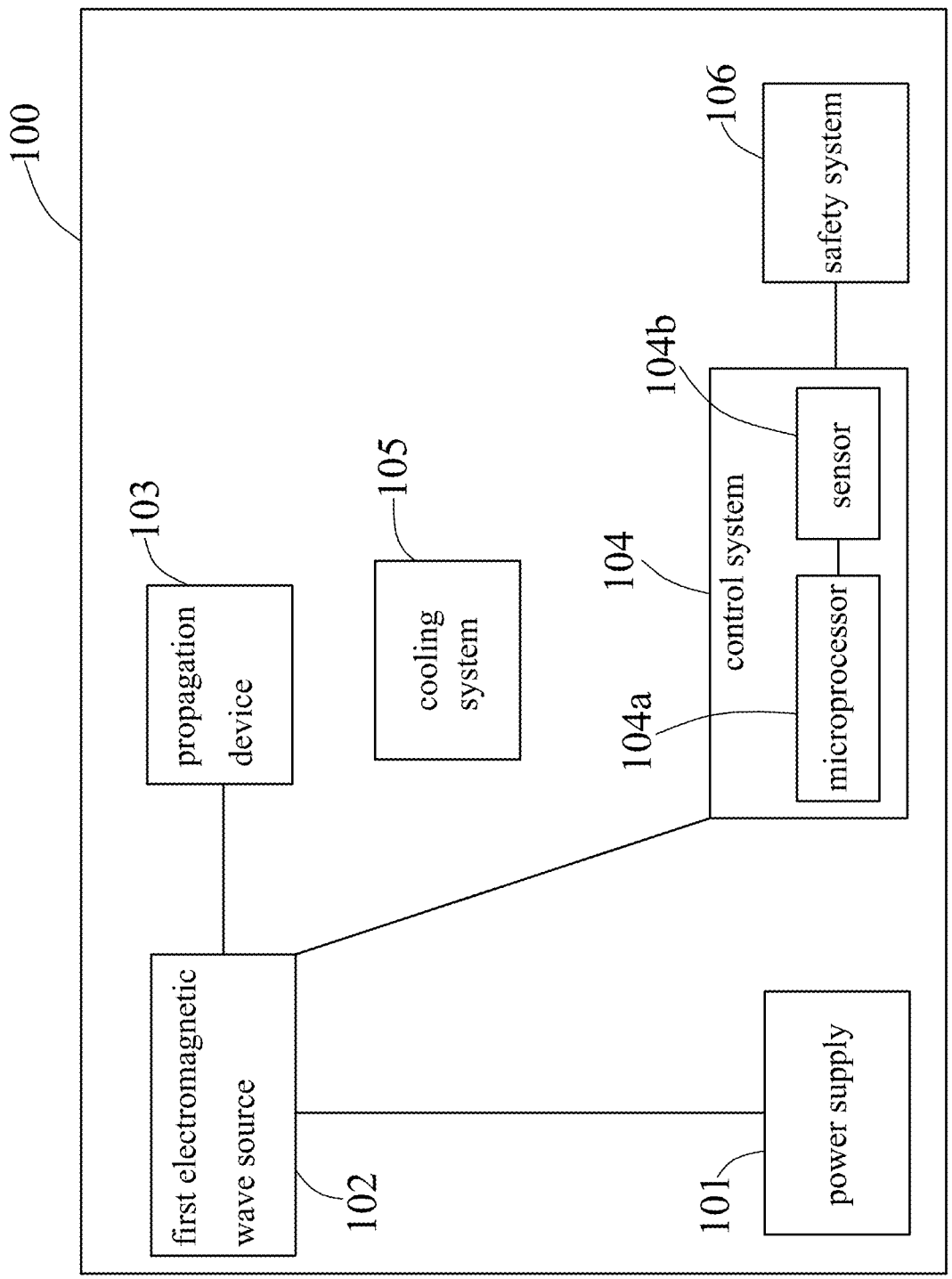
FIG. 2A illustrates one embodiment of the energy control apparatus of the present invention.

Referring concurrently to FIGS. 1 and 2A, which illustrate an embodiment of the energy control apparatus of the present invention. The energy control apparatus 100 includes a power supply 101, a first electromagnetic wave source 102, and a propagation device 103 for emitting electromagnetic waves, such as a waveguide or an antenna. The power supply 101 provides energy to the first electromagnetic wave source 102 to generate electromagnetic waves. The first electromagnetic wave source 102 can be a device that produces electromagnetic waves at specified wavelengths and energy levels, while the propagation device 103 guides the electromagnetic waves toward the precursor. Additionally, the energy control apparatus 100 may include a control system 104 for adjusting the wavelength and energy of the electromagnetic waves. In this embodiment, the control system 104 includes a microprocessor 104a or another type of controller, and sensors 104b for monitoring the wavelength and energy of the electromagnetic waves. The microprocessor 104a can adjust the operation of the first electromagnetic wave source 102 based on the readings from the sensors 104b to maintain the desired wavelength and energy levels. Furthermore, the energy control apparatus 100 can include a cooling system 105 and a safety system 106, where the cooling system 105 prevents the energy control apparatus 100 from overheating during operation, and the safety system 106 can shut down the energy control apparatus 100 in the event of a malfunction. Additionally, the energy control apparatus 100 also has a channel (not shown), through which the precursor is introduced and carried out.

In one embodiment of the present method, the precursor is introduced into the energy control apparatus 100 under specific temperature conditions. In this embodiment, the temperature is maintained within a range of 25 to 400 degrees Celsius. The introduction of the precursor into the energy control apparatus 100 is carried out by an inert carrier gas, which can be argon, helium, nitrogen, or a combination of these gases. The choice of inert carrier gas depends on its ability to maintain the precursor in a stable state and its compatibility with the precursor and the energy control apparatus 100. During this process, the flow rate of the inert carrier gas can be adjusted to optimize the formation of the excited state of the precursor. Higher flow rates may be used to rapidly introduce the precursor into the energy control apparatus, while lower flow rates may be used to ensure sufficient interaction between the precursor and the electromagnetic waves. The flow rate can also be adjusted based on changes in temperature or pressure inside the energy control apparatus. This allows for dynamic control of the process, ensuring the formation of a high-quality boron nitride layer on the substrate.

In one embodiment, the molecular molar concentration of the precursor containing boron and nitrogen atoms in the inert carrier gas is between 0.5% and 10%. The flow rate of the inert carrier gas entering the energy control apparatus 100 is set at 20-40 standard cubic centimeters per minute (sccm), the vapor pressure inside the energy control apparatus 100 is set at 20-60 torr, and the average residence time of the inert carrier gas is 10-100 seconds.

Figure 2B:
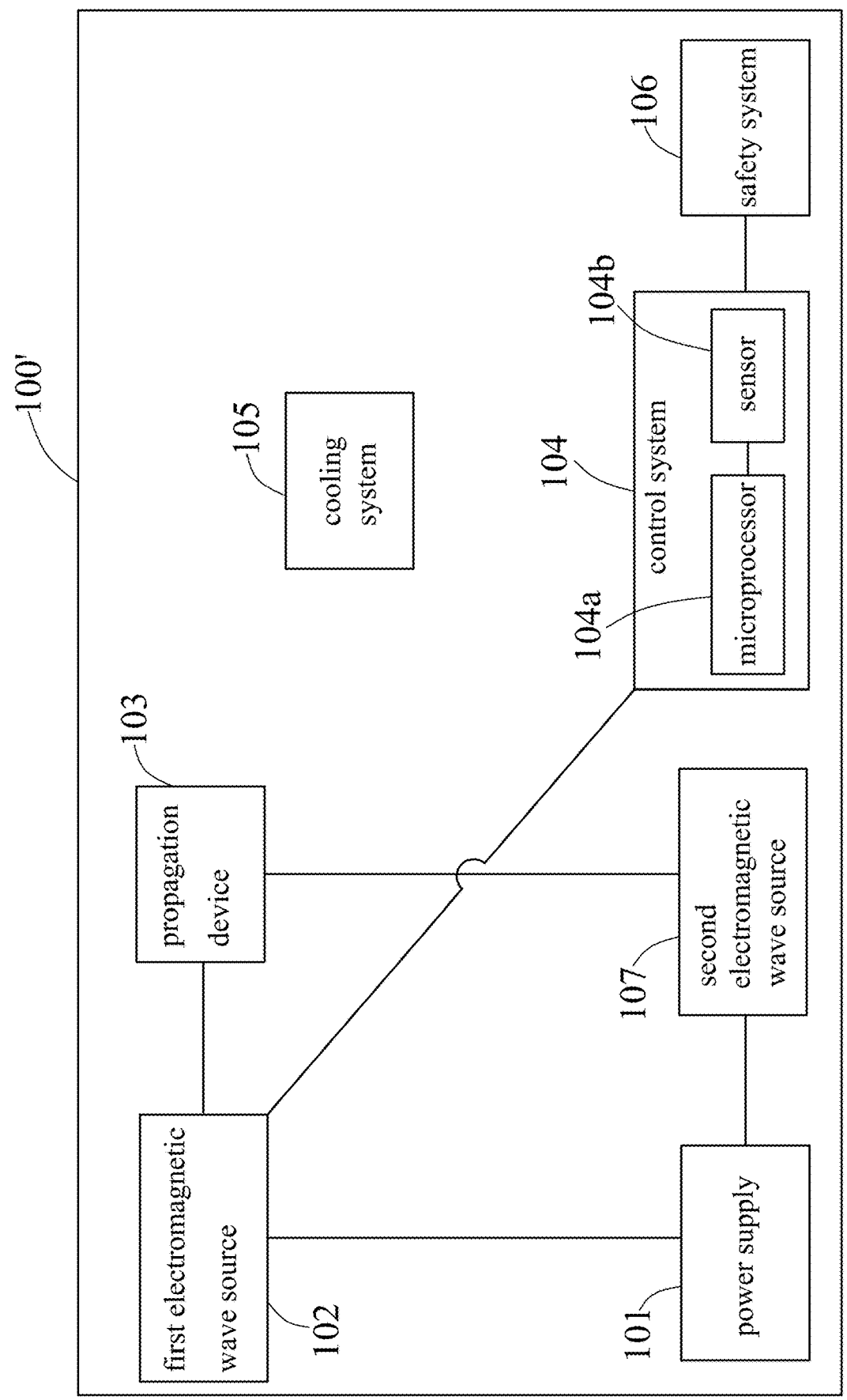
FIG. 2B illustrates another embodiment of the energy control apparatus of the present invention.

Continuing to refer to FIGS. 1 and 2A, in step S120, a higher energy state, or "excited state," is created in the precursor through the energy control apparatus 100. This excited state includes the boron and nitrogen atoms being in an excited state, or it includes some or all of the ligands being in a bond-breaking state. In one embodiment, the first electromagnetic wave source 102 of the energy control apparatus 100 emits electromagnetic waves with wavelengths controlled between 180-500 nm and energy ranging from 100 W to 600 W. In another specific embodiment, as shown in FIG. 2B, in addition to the components shown in FIG. 2A, the energy control apparatus 100' also includes a second electromagnetic wave source 107. The wavelength range of this second electromagnetic wave source 107 is between 0.5 nm and 180 nm, with power between 100 W and 600 W. The wavelength of this second electromagnetic wave source 107 is shorter than that of the first electromagnetic wave source 102, as shorter wavelengths correspond to higher energy photons. These higher energy photons can excite the precursor more effectively, leading to a more efficient formation of the excited state. By adjusting the first electromagnetic wave source 102 and the second electromagnetic wave source 107, the formation of the excited state of the precursor can be optimized.

Figure 3:
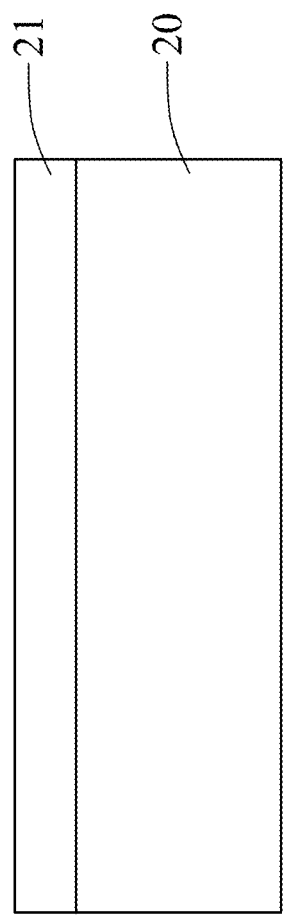
FIG. 3 illustrates a substrate with a boron nitride thin film formed thereon.

Referring to FIGS. 1 and 3, FIG. 3 illustrates a substrate on which a boron nitride thin film is formed. In step S130, the precursor in the excited state is guided to at least one surface of the substrate 20. The key to this step is that the precursor is in the excited state. In this excited state, the boron and nitrogen atoms, or some or all of the ligands of the precursor, are in a bond-breaking state. This bond-breaking state means that the boron and nitrogen atoms are excited and ready to react chemically with other atoms or molecules. This state is achieved by exposing the precursor to specific energy conditions provided by the energy control apparatus.

As the excited precursor is guided onto the substrate 20, the boron and nitrogen atoms in the excited state begin to form a new material layer 21 on the substrate, as shown in step S140. This new material layer 21 comprises boron nitride, i.e., a boron nitride thin film. The arrangement of boron and nitrogen atoms on the substrate determines the specific properties of the boron nitride layer formed. In summary, step S130 primarily involves guiding the precursor in the excited state onto the substrate and forming a material layer containing boron nitride on the substrate. During this process, the temperature of the substrate 20 is maintained at less than or about 400° C.

The material layer 21 may include hexagonal boron nitride (h-BN), cubic boron nitride (c-BN), or amorphous boron nitride (a-BN). Different types of boron nitride in the material layer, such as h-BN, c-BN, or a-BN, result from different structural arrangements of boron and nitrogen atoms in the material. These different structures lead to varying physical and chemical properties, which can be advantageous for different applications. For example, h-BN has a layered structure similar to graphite, making it very useful as a lubricant. On the other hand, c-BN has a structure similar to diamond, making it extremely hard and very useful for cutting tools. Amorphous boron nitride has a unique disordered structure, which gives it distinct physical and chemical properties not found in materials with ordered structures.

Therefore, amorphous boron nitride can exhibit superior performance in certain specialized applications, such as in high-temperature or high-pressure environments, or in situations requiring high wear resistance or corrosion resistance. Additionally, the disordered structure of amorphous boron nitride provides excellent thermal stability and chemical stability, allowing it to maintain its structure and performance in many high-temperature or chemically harsh environments. As a result, amorphous boron nitride is widely used in various industrial applications, such as high-performance lubricants, wear-resistant materials, and corrosion-resistant coatings.

In this embodiment, the material of the substrate 20 is selected from the group consisting of metals, metal alloys, ceramics, polymers, or combinations thereof. Specifically, the material of the metal substrate can be selected from the group consisting of aluminum, copper, steel, or combinations thereof. The material of the metal alloy substrate can be selected from the group consisting of stainless steel, brass, bronze, or combinations thereof. The ceramic substrate can be selected from the group consisting of aluminum oxide, zirconium oxide, silicon carbide, or combinations thereof. The material of the polymer substrate can be selected from the group consisting of polyethylene, polypropylene, polystyrene, or combinations thereof. The choice of substrate material can depend on various factors such as the desired properties of the boron nitride layer, the intended application of the product, and the conditions under which the product will be used.

For example, one skilled in the art may choose a metal or metal alloy substrate due to its high thermal conductivity. Additionally, one skilled in the art may choose a ceramic substrate for its high-temperature resistance. Furthermore, one skilled in the art may choose a polymer substrate for its low cost and ease of manufacture. The substrate may also be a combination of these materials. For instance, the material of the substrate 20 may be a metal-ceramic composite, a metal-polymer composite, a ceramic-polymer composite, or a metal-ceramic-polymer composite. Combining materials can achieve a balance of properties such as strength, toughness, thermal conductivity, and cost.

It is noteworthy that the substrate 20 can be treated or coated before depositing the boron nitride thin film to enhance the adhesion between the material layer 21 and the substrate 20. For example, the substrate can be cleaned, roughened, or coated with a primer or adhesion promoter. Additionally, in one embodiment, an electric field called substrate bias can be applied to the substrate 20 to reduce the deposition of charged particles on the surface of the substrate 20. The substrate bias can be either a positive bias or a negative bias, depending on the polarity of the charged particles. For example, if the charged particles are mainly positively charged, a positive bias is set; conversely, a negative bias is set if the charged particles are mainly negatively charged.

The purpose of setting the substrate bias is to repel charged particles that may interfere with the deposition process, thereby improving the quality of the deposited boron nitride. When a bias is applied to the substrate, the electric field influences the movement of the charged particles, making it more difficult for them to directly deposit on the substrate surface. This can reduce the random deposition of charged particles on the substrate surface, resulting in a smoother and more uniform material layer 21. Therefore, the setting of the substrate bias helps to enhance the quality of the boron nitride thin film.

Figure 4:
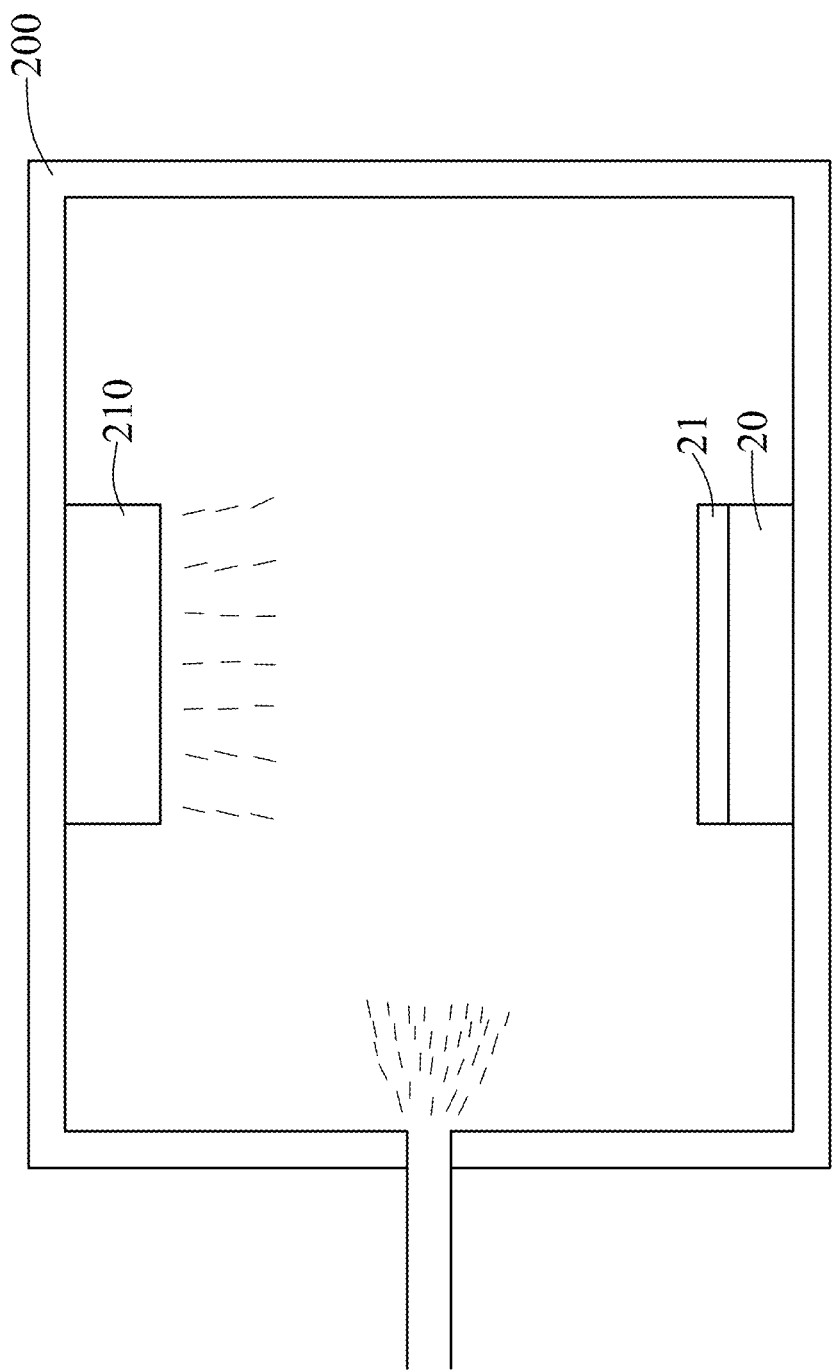
FIG. 4 is a schematic diagram of the interior of the reaction chamber.

Referring also to FIG. 4, FIG. 4 illustrates a schematic view of the interior of a reaction chamber. In one embodiment, step S130 is carried out in a reaction chamber 200 equipped with a plasma source 210. This design aims to increase the formation rate of boron nitride. In this process, the plasma source 210 within the reaction chamber 200 plays a critical role. The primary function of the plasma source 210 is to generate plasma, which is a gas containing an equal number of positive and negative charges in an electrically imbalanced state. In this state, the atoms or molecules of the gas are ionized by the energy from the plasma source 210, forming charged particles. These charged particles possess high energy and can further react chemically with the precursor.

During this chemical reaction process, the charged particles combine with the boron and nitrogen atoms in the precursor to form boron nitride. This chemical reaction takes place within the reaction chamber 200 and under the influence of the plasma source 210. Moreover, the plasma source 210 can take various forms, such as direct current (DC) plasma, radio frequency (RF) plasma, electron cyclotron resonance (ECR) plasma, or combinations thereof. Each type of plasma source has specific operating conditions and advantages. For instance, the DC plasma source is the most common type and uses direct current voltage to generate plasma. The RF plasma source uses radio frequency voltage to generate plasma, which can operate at lower pressures and produce higher plasma densities. The ECR plasma source uses a magnetic field to generate plasma, which can operate at extremely low pressures and produce very high plasma densities.

In this embodiment, the energy output of the plasma source 210 is set to exceed 300 W. This energy setting ensures that the plasma source can effectively generate plasma and provide sufficient energy to ionize the atoms or molecules of the gas, forming charged particles. This energy setting can also be adjusted according to specific application requirements. Furthermore, the plasma is composed of at least one gas selected from the group consisting of argon, helium, nitrogen, hydrogen, ammonia, or combinations thereof. The choice of these gases depends on their ability to effectively generate plasma and their compatibility with the precursor and the reaction chamber. For example, argon and helium are the most commonly used plasma gases because of their high ionization energy, which can produce high-density plasma. Nitrogen and hydrogen can be used for specific applications, such as when specific chemical reactions are needed in the plasma. Ammonia can be used when nitrogen-containing chemical reactions are required in the plasma.

In summary, the method for preparing boron nitride thin films according to the present invention has several significant advantages over existing boron nitride thin film deposition methods. Firstly, the method operates at lower temperatures, greatly reducing the risk of thermal damage to the substrate and decreasing energy consumption. This low-temperature operation method not only increases efficiency but also makes the method more environmentally friendly. Additionally, the method includes some optional steps that can further enhance the formation of the boron nitride layer. For example, applying a substrate bias can help reduce the deposition of charged particles on the substrate surface, improving the quality of the boron nitride layer. Furthermore, including a plasma source in the reaction chamber can increase the formation rate of boron nitride, thus improving production efficiency. These optional steps make the method more flexible in preparing boron nitride thin films and allow adjustments according to specific needs.

Although the present invention has been disclosed above in terms of preferred embodiments, they are not intended to limit the present invention. Anyone with ordinary skill in the art may make slight changes and modifications without departing from the spirit and scope of the present invention. Therefore, the scope of protection of the present invention shall be determined by the appended patent application scope.

The invention claimed is:

1. A method for preparing a boron nitride thin film, the method comprising:
   (a) providing a precursor containing boron and nitrogen atoms to an energy control apparatus;
   (b) forming an excited state of the precursor in the energy control apparatus, wherein the excited state includes boron and nitrogen atoms, or boron and nitrogen ligands in a bond-breaking state; and
   (c) forming a material layer on a substrate, wherein the material layer comprises boron nitride;
   wherein the energy control apparatus includes a first electromagnetic wave source that emits electromagnetic waves in a specific wavelength range.

2. The method for preparing a boron nitride thin film of claim 1, wherein the precursor is chosen from compounds where the molecular percentage of boron to nitrogen is 1:1.

3. The method for preparing a boron nitride thin film of claim 2, wherein the precursor is selected from the group consisting of borazine, trimethylamine borane, tetramethylammonium borane, boron nitride, ammonia borane, and tris(ethylmethylamino)borane, each having a molecular percentage of boron to nitrogen of 1:1.

4. The method for preparing a boron nitride thin film of claim 1, wherein the substrate material is selected from the group consisting of metals, metal alloys, ceramics, polymers, or combinations thereof.

5. The method for preparing a boron nitride thin film of claim 1, wherein the material layer comprises hexagonal boron nitride, cubic boron nitride, or amorphous boron nitride.

6. The method for preparing a boron nitride thin film of claim 1, wherein step (a) further comprises introducing the precursor into the energy control apparatus at a temperature between 25° C. and 400° C.

7. The method for preparing a boron nitride thin film of claim 6, wherein introducing the precursor into the energy control apparatus is performed using an inert carrier gas.

8. The method for preparing a boron nitride thin film of claim 7, wherein the inert carrier gas is selected from the group consisting of argon, helium, nitrogen, or combinations thereof.

9. The method for preparing a boron nitride thin film of claim 7, wherein the molar concentration of the precursor in the inert carrier gas is between 0.5% and 10%.

10. The method for preparing a boron nitride thin film of claim 7, wherein the flow rate of the inert carrier gas into the energy control apparatus is set between 20 sccm and 40 sccm.

11. The method for preparing a boron nitride thin film of claim 7, wherein the pressure within the energy control apparatus is set between 20 torr and 60 torr.

12. The method for preparing a boron nitride thin film of claim 7, wherein the average residence time of the inert carrier gas within the energy control apparatus is between 10 seconds and 100 seconds.

13. The method for preparing a boron nitride thin film of claim 1, wherein the first electromagnetic wave source emits electromagnetic waves having a wavelength range of 180 nm to 500 nm and a power between 100 W and 600 W.

14. The method for preparing a boron nitride thin film of claim 13, wherein the energy control apparatus includes a second electromagnetic wave source that emits electromagnetic waves having a wavelength range of 0.5 nm to 180 nm and a power between 100 W and 600 W.

15. The method for preparing a boron nitride thin film of claim 14, wherein the plasma includes at least one gas selected from the group consisting of argon, helium, nitrogen, hydrogen, ammonia, or combinations thereof.

16. The method for preparing a boron nitride thin film of claim 1, wherein step (c) further comprises forming a substrate bias on the substrate to reduce particle deposition on the substrate surface.

17. The method for preparing a boron nitride thin film of claim 1, wherein step (c) further comprises maintaining the temperature of the substrate at less than or about 400° C.

18. The method for preparing a boron nitride thin film of claim 1, wherein step (c) further comprises providing a reaction chamber containing a plasma source to increase the formation rate of boron nitride.

19. The method for preparing a boron nitride thin film of claim 18, wherein the plasma source is selected from the group consisting of direct current plasma, radio frequency plasma, electron cyclotron resonance plasma, or combinations thereof, and wherein the energy of the plasma is greater than 300 W.

\* \* \* \* \*